US012294193B2

(12) United States Patent
Hoppmann et al.

(10) Patent No.: US 12,294,193 B2
(45) Date of Patent: May 6, 2025

(54) CONNECTION ARRANGEMENT, CONNECTION CLAMP AND ELECTRONIC DEVICE

(71) Applicant: Phoenix Contact GmbH & Co. KG, Blomberg (DE)

(72) Inventors: Ralph Hoppmann, Bad Oeynhausen (DE); Martin Gebhardt, Porta Westfalica (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 316 days.

(21) Appl. No.: 17/777,289

(22) PCT Filed: Nov. 10, 2020

(86) PCT No.: PCT/EP2020/081558

§ 371 (c)(1),
(2) Date: May 17, 2022

(87) PCT Pub. No.: WO2021/099175

PCT Pub. Date: May 27, 2021

(65) Prior Publication Data

US 2022/0399658 A1 Dec. 15, 2022

(30) Foreign Application Priority Data

Nov. 19, 2019 (DE) ..................... 10 2019 131 141.1

(51) Int. Cl.
*H01R 4/48* (2006.01)

(52) U.S. Cl.
CPC ........... *H01R 4/483* (2023.08); *H01R 4/4835* (2023.08); *H01R 4/4821* (2023.08)

(58) Field of Classification Search
CPC .... H01R 4/4836; H01R 4/483; H01R 4/4835; H01R 4/4821

(Continued)

(56) References Cited

U.S. PATENT DOCUMENTS 8,475,191 B2 * 7/2013 Schafmeister ..... H01R 4/48365 439/489
9,240,650 B2 * 1/2016 Wu .......................... H01R 4/48

(Continued)

FOREIGN PATENT DOCUMENTS

DE 1967288 U 8/1967
DE 202006009460 U1 3/2007

(Continued)

*Primary Examiner* — Gary F Paumen
(74) *Attorney, Agent, or Firm* — LEYDIG, VOIT & MAYER, LTD.

(57) ABSTRACT

A connection arrangement for connecting an electrical conductor includes: a busbar; a clamping spring, which has a retaining leg and a clamping leg, the clamping leg being transferable into a clamping position and into a release position; a conductor connection space formed between a section of the busbar and the clamping leg of the clamping spring; a displaceably arranged guide element, which is in operative connection with the clamping leg of the clamping spring, the clamping leg being holdable in the release position by the guide element; and a pivotably mounted actuating element, by which the guide element is displaceable to transfer the clamping leg of the clamping spring from the clamping position into the release position. The clamping spring is arranged between the section of the busbar and the actuating element.

20 Claims, 3 Drawing Sheets

(58) Field of Classification Search
USPC .................................................. 439/438–439
See application file for complete search history.

(56) References Cited

U.S. PATENT DOCUMENTS

| | | | | |
|---|---|---|---|---|
| 10,283,880 | B2 * | 5/2019 | Kettern .................... | H01R 4/40 |
| 2006/0063419 | A1 * | 3/2006 | Steinkemper ...... | H01R 4/48275 439/441 |
| 2007/0099479 | A1 | 5/2007 | Holterhoff et al. | |
| 2010/0081316 | A1 * | 4/2010 | Eppe .................. | H01R 4/48365 439/441 |
| 2011/0086525 | A1 * | 4/2011 | Begemann ............. | H01R 12/57 439/83 |
| 2011/0318972 | A1 * | 12/2011 | Koellmann ........ | H01R 4/48365 439/729 |
| 2018/0248276 | A1 | 8/2018 | Kettern | |
| 2019/0190168 | A1 | 6/2019 | Witte | |
| 2021/0057830 | A1 | 2/2021 | Fehling et al. | |

FOREIGN PATENT DOCUMENTS

| | | | |
|---|---|---|---|
| DE | 202013100740 | U1 | 3/2013 |
| DE | 202014103797 | U1 | 11/2014 |
| DE | 102015115612 | A1 | 3/2017 |
| DE | 202016104971 | U1 | 12/2017 |
| DE | 102016115601 | A1 | 3/2018 |
| DE | 102017117459 | A1 | 2/2019 |
| DE | 202019101246 | U1 | 6/2019 |
| JP | H06168746 | A | 6/1994 |

* cited by examiner

CONNECTION ARRANGEMENT, CONNECTION CLAMP AND ELECTRONIC DEVICE

CROSS-REFERENCE TO PRIOR APPLICATIONS

This application is a U.S. National Phase application under 35 U.S.C. § 371 of International Application No. PCT/EP2020/081558, filed on Nov. 10, 2020, and claims benefit to German Patent Application No. DE 10 2019 131 141.1, filed on Nov. 19, 2019. The International Application was published in German on May 27, 2021 as WO 2021/099175 under PCT Article 21(2).

FIELD

The invention relates to a connection arrangement for connecting an electrical conductor. The invention further relates to a clamp terminal and an electronic device.

BACKGROUND

Such connection arrangements usually have a clamping spring taking the form of a leg spring, which clamping spring has a retaining leg and a clamping leg, wherein a conductor inserted into the connection arrangement can be clamped against the busbar by means of the clamping leg of the clamping spring. If, in particular, flexible conductors are clamped, prior to insertion of the conductor it will be necessary to move the clamping spring first into a release position by means of an actuating element and thus to actuate it, in order to pivot the clamping spring or the clamping leg away from the busbar, so that the conductor can be inserted into the intermediate space between the busbar and the clamping spring. Only with rigid and thus robust conductors can the conductor apply sufficient force to the clamping spring or to the clamping leg of the clamping spring in order to be able to pivot the clamping leg away from the busbar without the actuating element having to be actuated for this purpose by a user. In the case of flexible conductors, the user must first pivot the clamping spring away from the busbar by actuating the actuating element, so that the flexible conductor can be inserted. Here, the actuating element usually presses against the clamping leg of the clamping spring in order to pivot the clamping leg away from the busbar and release the conductor connection space.

SUMMARY

In an embodiment, the present invention provides a connection arrangement for connecting an electrical conductor, comprising: a busbar; a clamping spring, which has a retaining leg and a clamping leg, the clamping leg being transferable into a clamping position and into a release position; a conductor connection space formed between a section of the busbar and the clamping leg of the clamping spring; a displaceably arranged guide element, which is in operative connection with the clamping leg of the clamping spring, the clamping leg being holdable in the release position by the guide element; and a pivotably mounted actuating element, by which the guide element is displaceable to transfer the clamping leg of the clamping spring from the clamping position into the release position, wherein the clamping spring is arranged between the section of the busbar and the actuating element.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
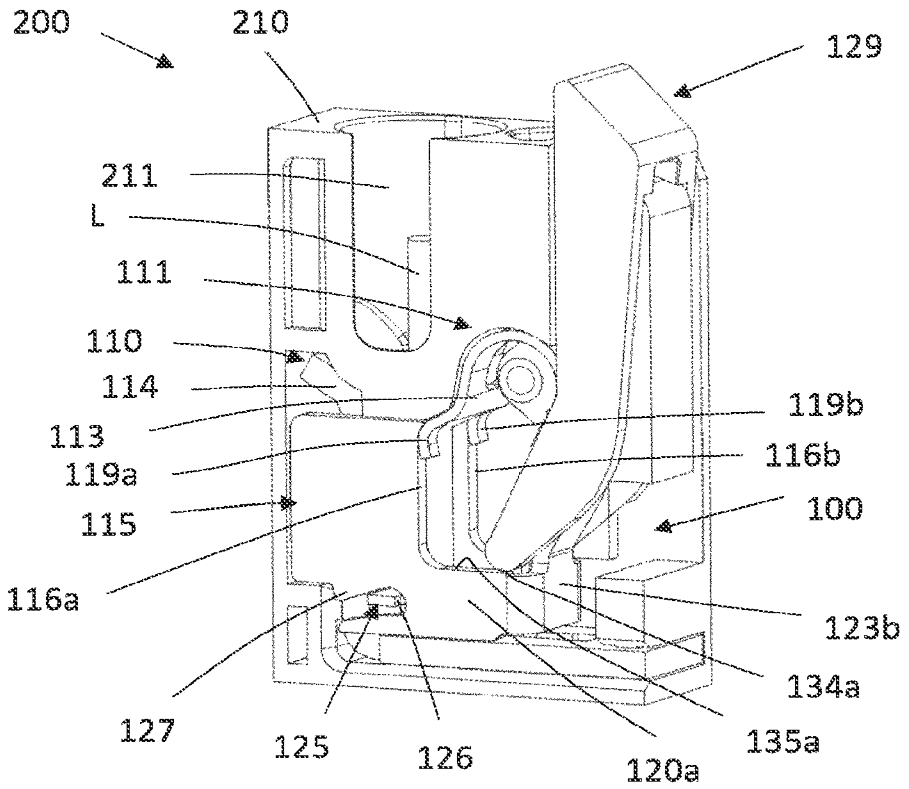
FIG. 1 is a schematic representation of a clamp terminal with a connection arrangement according to the invention with the clamping leg of the clamping spring in a clamping position.
Figure 2:
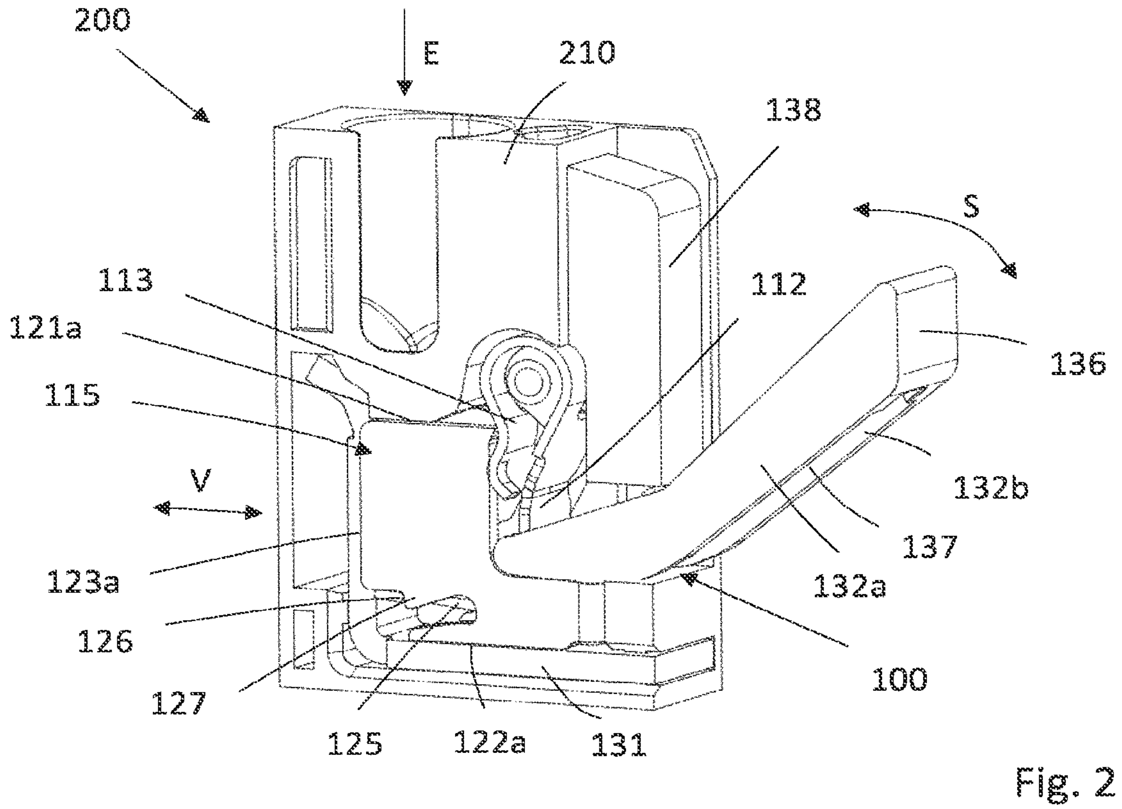
FIG. 2 is a schematic representation of the clamp terminal shown in FIG. 1 during actuation of the actuating element in order to transfer the clamping leg of the clamping spring from the clamping position into the release position.

In an embodiment, the present invention provides a connection arrangement along with a clamp terminal and an electronic device, with which handling while conductors are being connected can be simplified for a user.

The connection arrangement according to the invention has a busbar, a clamping spring, which has a retaining leg and a clamping leg, wherein the clamping leg is transferable into a clamping position and into a release position, a conductor connection space formed between a section of the busbar and the clamping leg of the clamping spring, a displaceably arranged guide element, which is in operative connection with the clamping leg of the clamping spring, wherein the clamping leg can be held in the release position by means of the guide element, and a pivotably mounted actuating element, by means of which the guide element is displaceable for transferring the clamping leg of the clamping spring from the clamping position into the release position. Here, the clamping spring is arranged between the section of the busbar and the actuating element.

The clamping spring is preferably designed as a leg spring, which has a retaining leg and a clamping leg designed to be pivoted relative to the retaining leg. By means of a pivoting movement of the clamping leg, the clamping leg can be guided into a release position, in which the clamping leg is arranged at a distance from the busbar, and a conductor that is to be connected can be guided into or out of an intermediate space formed thereby between the busbar and the clamping leg, and can be moved into a clamping position, in which the clamping leg can rest against the busbar or against the connected conductor in order to clamp the conductor against the busbar. The connection arrangement has a guide element mounted in particular horizontally displaceably, which is preferably operatively connected to the clamping spring both in the release position and in the clamping position of the clamping leg of the clamping spring, which means that the clamping leg, due to the operative connection with the guide element, can follow the displacement movement and thus the position of the guide element. The guide element holds the clamping leg in the release position against its spring force by the guide element pressing against the clamping leg. The guide element can be designed as a slide element. The connection arrangement also has a pivotably mounted actuating element, by means of which the guide element can be displaced in order to transfer the clamping leg of the clamping spring from the clamping position into the release position. The actuating element is designed in such a way that, by means of a pivoting movement of the actuating element, the actuating element can apply a compressive force to the guide element in order to displace it against the spring force of the clamping leg of the clamping spring until the clamping leg reaches the release position. Due to the displacement movement of the guide element, the guide element can apply a tensile force to the clamping leg of the clamping spring in order to transfer the clamping leg from the clamping position into the release position. The actuating element is preferably pivotable in a direction that is oriented counter to a pivoting direction of the clamping leg from the clamping position into the release position. When there is a pivoting movement of the actuating element in the clockwise direction in order to transfer the clamping leg from the clamping position into the release position, the clamping leg will be pivoted counterclockwise. When there is a counterclockwise pivoting movement of the actuating element, the clamping leg will be pivoted clockwise. The actuating element is arranged such that it does not penetrate into the conductor connection space, so that an interaction of the actuating element with the connected conductor can be prevented. On the other hand, the clamping spring, the busbar and the actuating element are arranged such that the clamping spring is arranged between the section of the busbar against which a conductor to be connected is clamped and the actuating element. As a result, the handling of the connection arrangement can be significantly simplified for a user when an electrical conductor is being connected, since the actuating element is positioned away from the conductor connection space and thus the insertion of a conductor is not hindered by the actuation of the actuating element. The actuating element does not act directly on the clamping spring, but indirectly via the guide element.

The guide element can have a slide face along which the actuating element can be guided during a pivoting movement of the guide element. At the slide face, the actuating element can rest on the guide element at least during a pivoting movement of the actuating element for transferring the clamping leg from the clamping position into the release position. By means of the slide face, the actuating element can slide along the guide element during its pivoting movement and thus apply a compressive force to the guide element in order to move the guide element.

The guide element can have two longitudinal side walls and two end walls arranged at right angles to the two longitudinal side walls, wherein the slide face can be arranged on one of the two end walls of the guide element. The guide element can have a rectangular design due to the two longitudinal side walls and the two end walls arranged at right angles thereto. The guide element can form a frame that, in particular, can enclose or grasp the section of the busbar against which the conductor can be clamped and the clamping spring. The slide face is preferably oriented such that the slide face extends transversely to the two longitudinal side walls. The slide face can form an extension of the end wall on which the slide face is arranged. The slide face can form an inclined surface that can extend with an angle of inclination between 30° and 50° to the end wall on which the slide face is arranged.

The actuating element can have a rotational element that can be moved along the slide face of the guide element during a pivoting movement of the actuating element. The pivot movement of the actuating element can take place around the rotational element, so that the pivot point of the actuating element lies on the rotational element. This means that a force transmission from the actuating element to the guide element can thus be applied directly at the location of the pivot point of the actuating element in order to move the actuating element. Such an embodiment makes a particularly small-dimensioned, compact design possible. The rotational element can take the form of a shaft.

The actuating element can have two arms arranged parallel to one another, wherein the rotational element can extend between the two arms. The rotational element is preferably oriented transversely to the longitudinal extension of the two arms. The rotational element is preferably attached at a first end to a first of the two arms, and the rotational element is fastened at a second end to a second of the two arms.

The two arms can each have a guide surface on one end section, which guide surfaces can slide along an edge face of the two longitudinal side walls of the guide element during a pivoting movement of the actuating element. The actuating element can be supported on the guide element via the guide surfaces of the arms, so that a tilting of the actuating element relative to the guide element can be prevented during a pivoting movement of the actuating element. The guide surfaces can in each case be rounded.

So that no additional tool, such as a screwdriver, is needed to be able to actuate the actuating element, the actuating element can have a grip section for the manual actuation of the actuating element. The grip section can be formed on an end section of the arms of the actuating element opposite the guide surfaces.

Starting from an edge face of one of the two end walls, the slide face of the guide element can extend in the direction of the actuating element. The slide face can thus form an extension of one of the two end walls in the direction of the actuating element.

The guide element is preferably displaceable in such a way that a displacement movement of the guide element transversely to an insertion direction of the conductor to be connected can take place in the conductor connection space. In this way, a particularly compact design is possible, as a result of which the connection arrangement can stand out due to a reduced installation space.

In order to be able to form an operative connection between the guide element and the clamping leg of the clamping spring, it can be provided that the guide element has at least one spring contact edge against which the clamping leg can rest. The spring contact edge can be designed such that the clamping leg or at least a part of the clamping leg can rest against the spring contact edge, both in the release position and in the clamping position. The spring contact edge can be formed, for example, on a shoulder of the guide element.

In order to be able to achieve a uniform guidance of the guide element and of the clamping leg of the clamping spring, two such spring contact edges can be formed on the guide element, so that the clamping leg can be guided on the guide element via two such spring contact edges. The two spring contact edges preferably extend parallel to one another on the guide element.

With such a design, it is possible for the clamping leg to have two slide sections, each arranged on the side of a main section having a clamping edge, and for the guide element to have two spring contact edges arranged at a distance from one another, wherein a first slide section can rest against a first spring contact edge and a second slide section can rest against a second spring contact edge. The two slide sections preferably each have a shorter length than the main section of the clamping leg. The main section and the two slide sections preferably extend parallel to each other. The two slide sections are in each case preferably curved, so that they can each form a skid that can slide along a respective spring contact edge. However, the main section is preferably straight.

The two longitudinal side walls of the guide element can be designed to be so long in the insertion direction of the conductor that the two longitudinal side walls can delimit the conductor connection space on a first side and on a second side opposite the first side. The guide element can thus also form a guide of the conductor to be connected when the conductor is being inserted into the conductor connection space. The two longitudinal side walls can prevent the incorrect insertion of the conductor. The conductor connection space can thus be delimited on two of its sides by the guide element and on its other two sides by the busbar and by the clamping leg of the clamping spring. One of the two spring contact edges can be formed in each case on the two longitudinal side walls.

In order to be able to achieve a stable mounting of the clamping spring, the clamping spring can be supported on the busbar via its retaining leg. For this purpose, the clamping spring can rest flat with a section of the retaining leg against a part of the busbar, for example. In addition, the retaining leg can also have an opening through which the part of the busbar can pass, so that the retaining leg can be attached to the busbar. The part of the busbar against which the retaining leg of the clamping spring is supported is preferably arranged opposite the section of the busbar against which a conductor can be clamped. This part of the busbar can form an end section of the busbar.

The connection arrangement can also comprise a release element, which in the release position of the clamping spring can be in engagement with the guide element. When the conductor to be connected is being inserted into the conductor connection space, the release element can be actuated thereby in such a way that the release element comes out of engagement with the guide element and the guide element can be displaced by a spring force of the clamping leg in such a way that the clamping leg can be transferred into the clamping position in order to clamp the conductor against the busbar. By providing a release element, a flexible conductor in particular can be connected without actuation of the actuating element and can be clamped against the busbar. To be able to hold the guide element in the release position, the guide element can be in engagement with the release element in the release position of the clamping leg of the clamping spring. When the release element is in engagement with the guide element, a displacement movement of the guide element will not be possible or will be stopped. Via an operative connection or coupling of the release element to the guide element and of the guide element to the clamping leg of the clamping spring in the release position of the clamping leg, the clamping leg can be held in this release position without the assistance of the actuating element, so that in particular a flexible conductor can be inserted into the thus free conductor connection space between the busbar and the clamping spring. The release element can have a pressure surface facing in the direction of the conductor connection space, which can be arranged flush with an insertion region of the conductor in the connection arrangement or flush with the conductor connection space, so that the conductor rests against the pressure surface of the release element during insertion into the connection arrangement, as a result of which a compressive force can be applied by the conductor to the release element. By applying a compressive force to the pressure surface by means of the conductor and thus to the release element, the release element can be brought into a pivoting movement or tilting movement in the direction of the insertion direction of the conductor, so that the release element can be pivoted or tilted away from the guide element in the insertion direction of the conductor. As a result of the pivoting movement of the release element, the release element can be brought out of engagement with the guide element, so that the guide element is freely displaceable again and the guide element can thereby be displaced solely by the spring force of the clamping leg without manual assistance in such a way that the clamping leg can be transferred from the release position into the clamping position. By means of this special mechanism, a flexible conductor can be connected in a particularly simple manner solely by the insertion movement of the conductor, without a user having to actuate further elements, such as the actuating element, in order to release the clamping spring and move it from the release position into the clamping position. This facilitates the handling of the connection arrangement and saves time when connecting a conductor. The release element preferably extends over the region between the section of the busbar against which a conductor can be clamped, and the clamping spring, so that the release element can delimit the conductor connection space to one side.

In order to release the release element from the guide element by means of the conductor inserted into the conductor connection space and thus to be able to disengage it from the guide element, the release element can be mounted so as to be tiltable relative to the guide element. The release element can thus be designed like a rocker. If the conductor to be connected is pressed against the release element, the release element can tilt in the insertion direction of the conductor, in order to come out of engagement with the guide element and thus release the guide element so that it is again freely displaceable.

In order to be able to form an engagement of the release element with the guide element in the release position of the clamping leg of the clamping spring, the release element can have at least one undercut, with which at least one latching lug of the guide element can latch when the clamping leg of the clamping spring is in the release position. As a result, a latching connection can be formed between the guide element and the release element when the clamping leg of the clamping spring is in the release position. The release element preferably has two undercuts and the guide element preferably has two latching lugs, so that a double-acting latching can be formed between the guide element and the release element. If two undercuts are provided, they will preferably be formed on two parallel side faces of the release element.

The release element can be connected to the retaining leg of the clamping spring. The release element is preferably connected to the retaining leg in such a way that the release element can be pivoted relative to the retaining leg. The pivot axis is then preferably formed in the region of the connection of the release element to the retaining leg of the clamping spring. The connection between the retaining leg and the release element can preferably be designed such that the retaining leg is formed integrally with the release element. However, it is also possible for the release element to be an element formed separately from the clamping spring, the busbar and the guide element.

The solution of the object according to the invention is also achieved by means of a clamp terminal, in particular a terminal block, which has at least one connection arrangement formed and further developed as described above. The clamp terminal can be arranged, for example, on a circuit board. If the clamp terminal is designed as a terminal block, it can be arranged on a mounting rail.

It is also possible for a clamp terminal arrangement to be provided, which can have a plurality of clamp terminals arranged in a row, each of which can have at least one connection arrangement formed and further developed as described above.

In addition, a plug-in connector can also be provided, which can have one or more of the above-described formed and further developed connection arrangements.

In addition, the object according to the invention can be achieved by means of an electronic device, which can have at least one connection arrangement formed and further developed as described above and/or at least one clamp terminal formed and further developed as described above.

Figure 3:
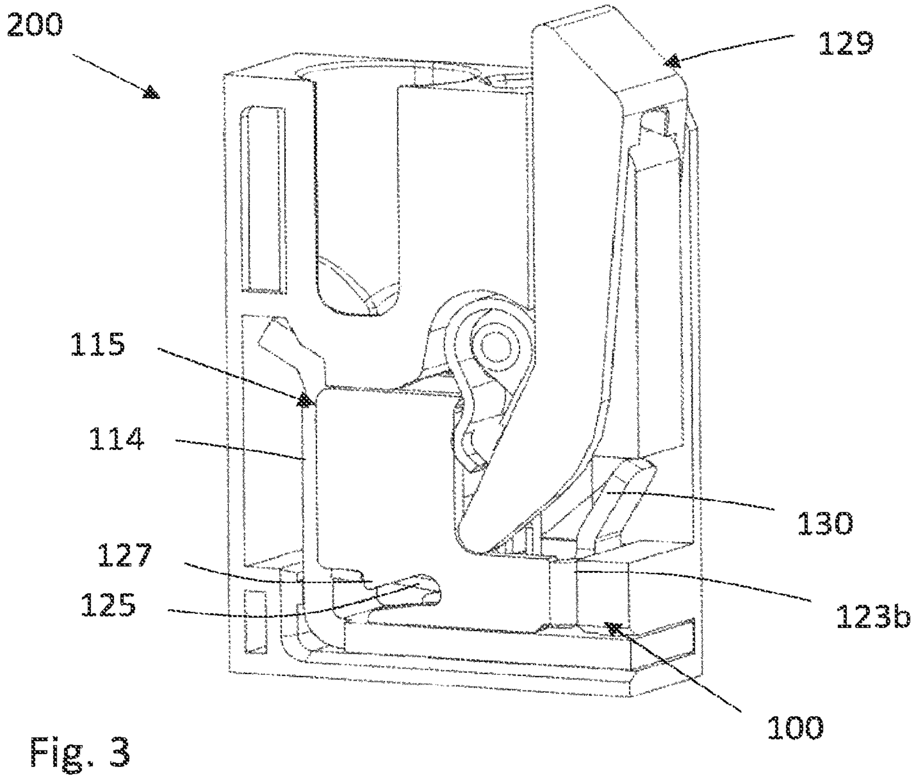
FIG. 3 is a schematic representation of the clamp terminal shown in FIG. 1 with the clamping leg of the clamping spring in a release position.
Figure 4:
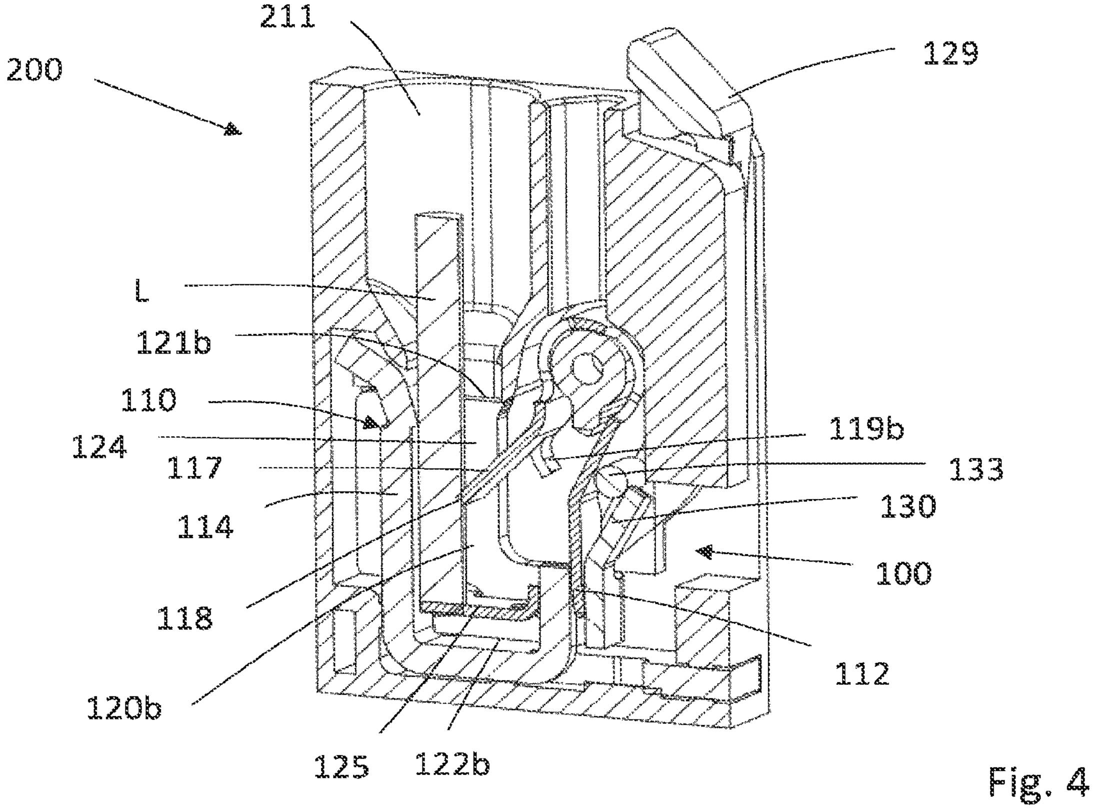
FIG. 4 is a schematic sectional representation of the clamp terminal shown in FIG. 1.

FIGS. 1 to 6 show a clamp terminal 200 with a housing 210, which can be formed from an insulating material, wherein a connection arrangement 100 for connecting a conductor L, as shown for example in FIGS. 1 and 4, is arranged or accommodated in the housing 210.

Figure 5:
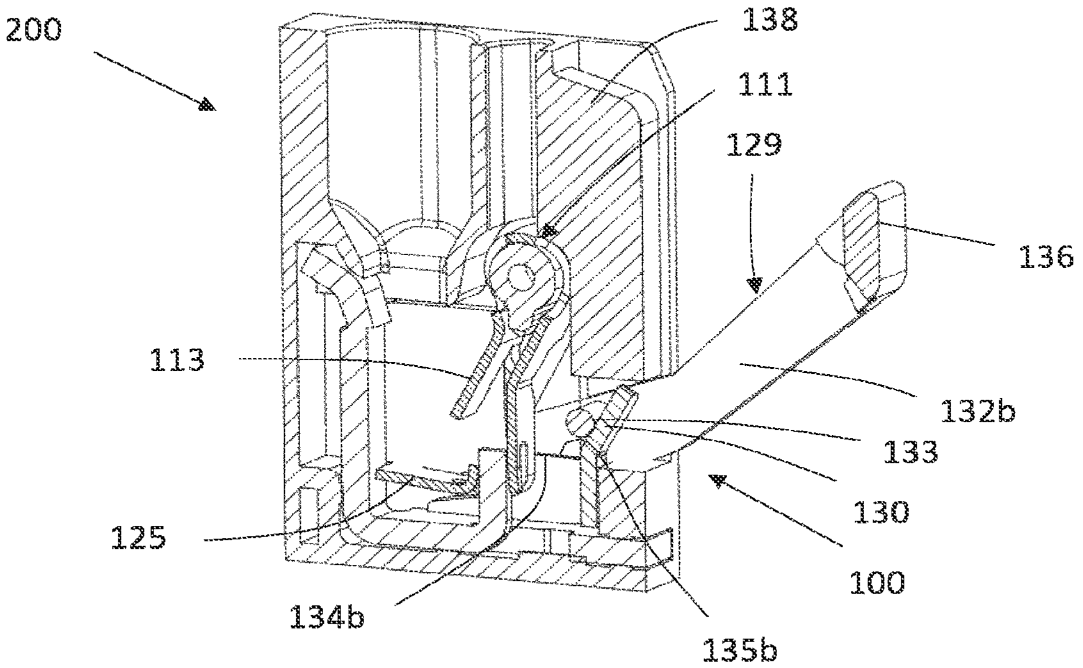
FIG. 5 is a schematic sectional representation of the clamp terminal shown in FIG. 2.
Figure 6:
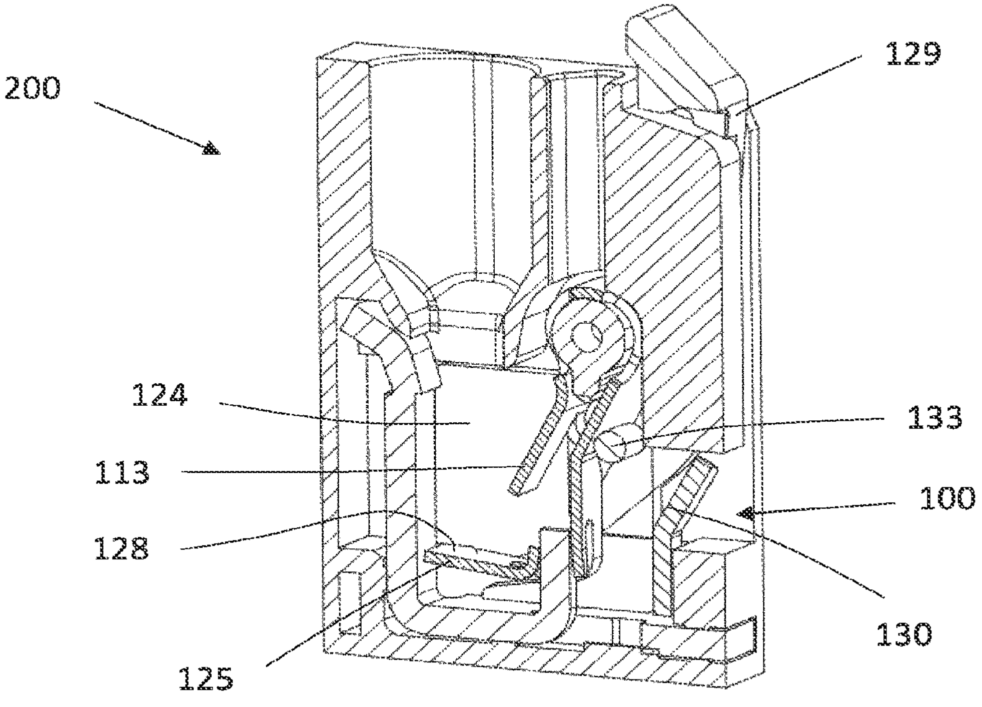
FIG. 6 is a schematic sectional representation of the clamp terminal shown in FIG. 3.

The connection arrangement 100 has a busbar 110 and a clamping spring 111 designed as a leg spring, as can be seen in particular also in the sectional views in FIGS. 4 to 6. The clamping spring 111 has a retaining leg 112 and a clamping leg 113. The retaining leg 112 is held in a fixed position, whereas the clamping leg 113 is pivotable relative to the retaining leg 112. By a pivoting movement of the clamping leg 113, it can be transferred into a clamping position, as shown in FIGS. 1 and 4, and into a release position, as is shown in particular in FIGS. 3 and 6. In the clamping position, the clamping leg 113 presses against a section 114 of the busbar 110 or against a conductor inserted into the connection arrangement 100, in order to clamp said conductor against the section 114 of the busbar 110 and connect the same. In the release position, the clamping leg 113 is positioned at a distance from the section 114 of the busbar 110, so that a conductor L can be inserted into the free space thereby formed between the section 114 of the busbar 110 and the clamping leg 113.

The clamping spring 111 is supported on the busbar 110 by its retaining leg 112.

The connection arrangement 100 also has a guide element 115. The guide element 115 is mounted displaceably in particular in relation to the busbar 110, so that the guide element 115 can perform a horizontal displacement movement V.

By means of the guide element 115, the clamping leg 113 of the clamping spring 111 can be transferred from the clamping position into the release position and held in the release position. For this purpose, the guide element 115 is operatively connected to the clamping leg 113 of the clamping spring 111.

In the embodiment shown here, the guide element 115 has two spring contact edges 116*a*, 116*b* arranged parallel to each other, against which the clamping leg 113 rests.

The clamping leg 113 has a main section 117, on the free end of which a clamping edge 118 is formed. Two slide sections 119*a*, 119*b* are formed on the side of the main section 117, so that the main section 117 is arranged between the two slide sections 119*a*, 119*b*. The two slide sections 119*a*, 119*b* rest on the two spring contact edges 116*a*, 116*b* of the guide element 115, wherein the slide section 119*a* rests against the spring contact edge 116*a* and the slide section 119*b* rests against the spring contact edge 116*b*. The slide sections 119*a*, 119*b* rest on the spring contact edges 116*a*, 116*b* not only in the release position, but also in the clamping position of the clamping leg 113 of the clamping spring 111.

The slide sections 119*a*, 119*b* have a shorter length than the main section 117. The slide sections 119*a*, 119*b* are curved so that they form a skid shape, by means of which the slide sections 119*a*, 119*b* can slide along the spring contact edges 116*a*, 116*b* when the clamping leg 113 is being transferred into the release position and into the clamping position.

The two spring contact edges 116*a*, 116*b* are formed on opposite longitudinal side walls 120*a*, 120*b* of the guide element 115. The two longitudinal side walls 120*a*, 120*b* are arranged parallel to each other. The two longitudinal side walls 120*a*, 120*b* in each case have an upper edge 121*a*, 121*b* and an opposite lower edge 122*a*, 122*b*. The spring contact edges 116*a*, 116*b* in each case extend perpendicular to the upper edge 121*a*, 121*b*. Starting from the horizontally extending upper edge 121*a*, 121*b*, the spring contact edges 116*a*, 116*b* extend downwardly in the direction of the horizontally extending lower edge 122*a*, 122*b* of the guide element 115. In the case of a displacement movement of the guide element 115, the lower edges 122*a*, 122*b* can slide parallel to a section 131 of the busbar 110, which is aligned or oriented perpendicular to the section 114 of the busbar 110 on which a conductor L is clamped.

The busbar 110 and the clamping spring 111 are arranged between the two longitudinal side walls 120*a*, 120*b* of the guide element 115. The busbar 110 and the clamping spring 111 are enclosed by the guide element 115. The guide element 115 can thus form a frame, which accommodates the busbar 110 and the clamping spring 111 in its interior.

The guide element 115 also has two end walls 123*a*, 123*b*, which are aligned parallel to each other. The two end walls 123*a*, 123*b* are arranged transversely to the two longitudinal side walls 120*a*, 120*b* of the guide element 115. The guide element 115 thus has an essentially rectangular cross-section.

A conductor connection space 124, into which a conductor L to be connected can be inserted, is formed between the section 114 of the busbar 110 and the clamping leg 113. The conductor connection space 124 is covered or delimited by the two longitudinal side walls 120*a*, 120*b* of the guide element 115, so that the guide element 115 also forms a guide for the conductor L to be connected.

The conductor connection space 124 is designed to align with a conductor insertion opening 211 formed in the housing 210, via which the conductor L to be connected can be inserted into the housing 210 of the clamp terminal 200 in the insertion direction E.

The connection arrangement 100 also has a release element 125. The release element 125 is arranged in alignment with the conductor insertion opening 211 and the conductor connection space 124. The release element 125 delimits the conductor connection space 124 downwards.

In the release position of the clamping leg 113 of the clamping spring 111, the release element 125 is in engagement with the guide element 115, as can be seen in particular in FIG. 3, as a result of which the guide element 115 is held in its position and is thus also held in its position via the spring contact edges 116*a*, 116*b* and the slide sections 119*a*, 119*b* of the clamping legs 113, so that an undesired pivoting back of the clamping leg 113 from the release position into the clamping position can be prevented.

The release element 125 has two laterally arranged undercuts 126, which, in the release position of the clamping leg 113 of the clamping spring 111, are in engagement in each case with a latching lug 127 of the guide element 115, in order to form a latching between the guide element 115 and the release element 125. A first latching lug 127 is formed on the longitudinal side wall 120*a* and a second latching lug 127 is formed on the longitudinal side wall 120*b*. Due to the two undercuts 126 the release element 125 has a T-shape.

In the clamping position, the release element 125 is out of engagement with the guide element 115, as can be seen in FIG. 1, so that the guide element 115 is freely displaceable.

The release element 125 is mounted so as to be tiltable relative to the guide element 115.

When a conductor L to be connected is inserted along the insertion direction E via the conductor insertion opening 211 and into the conductor connection space 124, the conductor L rests against the release element 125, as a result of which the release element 125 is tilted relative to the guide element 115 and thereby disengages from the guide element 115, so that the guide element 115 can be freely displaced again, and the guide element 115 can thereby be displaced by the spring force of the clamping leg 113 alone without manual assistance in such a way that the clamping leg 113 can be transferred from the release position into the clamping position.

The release element 125 has a pressure surface 128 that faces in the direction of the conductor connection space 124 and is arranged aligned with the conductor insertion opening 211 or aligned with the conductor connection space 124, so that the conductor L rests against the pressure surface 128 of the tripping element 125 when it is being inserted into the connection arrangement 100, as a result of which a compressive force is applied by the conductor L to the release element 125. By applying a compressive force to the pressure surface 128 by means of the conductor L and thus to the release element 125, the release element 125 can be brought into a pivoting movement or tilting movement in the direction of the insertion direction E of the conductor L, so that the release element 125 can be pivoted or tilted away from the guide element 115 in the insertion direction E of the conductor L.

In the development shown here, as can be seen in particular in FIGS. 5 and 6, the release element 125 is connected to the retaining leg 112 of the clamping spring 111. The release element 125 is connected in such a way that the release element 125 is pivotable relative to the retaining leg 112, which remains in a fixed position. The pivot axis can be formed in the region of the connection of the release element 125 to the retaining leg 112.

The displacement movement V of the guide element 115, when this is out of engagement with the release element 125, takes place in a direction that is oriented transversely to the insertion direction E of the conductor L to be connected into the conductor connection space 124.

In order to transfer the clamping leg 113 back from the clamping position into the release position against its spring force by means of the guide element 115, the connection arrangement 100 has an actuating element 129. The actuating element 129 is mounted so as to be pivotable according to the arrow S. The actuating element 129 can be pivoted on an outer side of the housing 210 of the clamp terminal 200.

The actuating element 129 is designed in the form of a pivot lever. In length the actuating element 129 extends over more than two-thirds of the height of the housing 210 of the clamp terminal 200.

The actuating element 129 has two arms 132*a*, 132*b* extending parallel to each other. The two arms 132*a*, 132*b* extend over the length of the actuating element 129. A rotational element 133 taking the form of a shaft is arranged between the two arms 132*a*, 132*b*. The rotational element 133 extends transversely to the longitudinal extension of the two arms 132*a*, 132*b*.

The guide element 115 has a slide face 130 formed in the form of an inclined surface along which the actuating element 129 can be guided. In the development shown here, the slide face 130 is formed on the end wall 123*b* of the guide element 115. The slide face 130 extends, starting from the end wall 123*b*, in the direction of the actuating element 129. The slide face 130 by its formation as an inclined surface is arranged inclined, so that the slide face 130 extends here at an angle between 130° and 160° to the end wall 123*b* of the guide element 115.

Alternatively, it would also be possible for the slide face 130 to be arranged at a distance from the end wall 123*b* between the two longitudinal side walls 120*a*, 120*b*, so that the slide face 130 is directly connected to the longitudinal side walls 120*a*, 120*b*.

The rotational element 133 forms the pivot point about which the actuating element 129 can be pivoted along the pivoting direction S. When the actuating element 129 is actuated, the rotational element 133 is operatively connected to the slide face 130 of the guide element 115 by the rotational element 133 being able to slide along the slide face 130 of the guide element 115 during a pivoting movement of the actuating element 129 for transferring the clamping leg 113 from the clamping position into the release position, as can be seen in particular in FIG. 5. By sliding the rotational element 133 along the slide face 130, the actuating element 129 exerts a compressive force on the slide face 130 and thus on the guide element 115, as a result of which the guide element 115 is displaced horizontally by a displacement movement V.

By means of the actuating element 129, the guide element 115 can be displaced in such a way that the clamping leg 113 of the clamping spring 111 resting against the guide element 115 can be transferred from the clamping position into the release position. When the actuating element 129 is actuated in the pivoting direction S, the actuating element 129 can be pivoted downward in such a way that it exerts a compressive force on the guide element 115 via the rotational element 133, in order to displace the guide element 115 against the spring force of the clamping leg 113 of the clamping spring 115 in such a way that the guide element 115 can engage with the release element 125 when the release position of the clamping leg 113 is reached. This displacement movement V of the guide element 115 causes the clamping leg 113 to pivot from the clamping position into the release position.

If the clamping leg 113 is in the release position and the guide element 115 is latched with the release element 125, the actuating element 129 can be pivoted back into its initial position, as can be seen in FIGS. 3 and 6. By means of the guide element 115, the clamping leg 113 remains in its release position without the assistance of the actuating element 129. In this release position, the rotational element 133 of the actuating element 129 is positioned away from the slide face 130. Only when the release element 125 is actuated by means of a conductor L and thus when the latching between the release element 125 and the guide element 115 is released, as a result of which the guide element 115 is displaced by the force of the clamping leg 113, so that it can move into the clamping position, will the rotational element 133 of the actuating element 129 come back to rest against the slide face 130 of the guide element 115, as is shown, for example, in FIGS. 1 and 4.

The two arms 132*a*, 132*b* have in each case a guide surface 134*a*, 134*b* on one of their end sections, which guide surface can in each case slide along an edge face 135*a*, 135*b* of the two longitudinal side walls 120*a*, 120 of the guide element 115 during a pivoting movement of the actuating element 129. The edge surfaces 135*a*, 135*b* are in each case formed at a right angle to the spring contact edges 116*a*, 116*b*. The edge surfaces 135*a*, 135*b* extend parallel to the upper edge 121*a*, 121*b*, in that the edge surfaces 135*a*, 135*b* are arranged offset in height relative to the respective upper edge 121*a*, 121*b*. Via the guide surfaces 134*a*, 134*b*, the actuating element 129 can roll on the guide element 115, in particular on the edge faces 135*a*, 135*b* of the guide element 115.

A grip section 136, by which the actuating element 129 can be manually actuated, is formed on an end section of the arms 132*a*, 132*b*, which end section is formed opposite the guide surfaces 134*a*, 134*b*.

Between the two arms 132*a*, 132*b*, the actuating element 129 has a free space 137 through which, in the initial position, as shown in FIGS. 1, 3, 4 and 6, a part 138 of the housing 210 of the connection arrangement 200 passes.

The actuating element 129 is arranged adjacent to the retaining leg 112 of the clamping spring 111. The actuating element 129 is thus arranged behind the clamping spring 111. The clamping spring 111 is arranged between the section 114 of the busbar 110 and the actuating element 129.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connection arrangement
110 Busbar

111 Clamping spring
112 Retaining leg
113 Clamping leg
114 Section of the busbar
115 Guide element
116*a*, 116*b* Spring contact edge
117 Main section
118 Clamping edge
119*a*, 119*b* Slide section
120*a*, 120*a* Longitudinal side wall
121*a*, 121*b* Upper edge
122*a*, 122*b* Lower edge
123*a*, 123*b* End wall
124 Conductor connection space
125 Release element
126 Undercut
127 Latching lug
128 Pressure surface
129 Actuating element
130 Slide face
131 Section of the busbar
132*a*, 132*b* Arm
133 Rotational element
134*a*, 134*b* Guide surface
135*a*, 135*b* Edge face
136 Grip section
137 Free space
138 Part of the housing
200 Clamp terminal
210 Housing
211 Conductor insertion opening
V Displacement movement
E Insertion direction
S Pivoting direction
L Conductor

The invention claimed is:

1. A connection arrangement for connecting an electrical conductor, comprising:

a busbar;

a clamping spring, which has a retaining leg and a clamping leg, the clamping leg being transferable into a clamping position and into a release position;

a conductor connection space formed between a section of the busbar and the clamping leg of the clamping spring;

a displaceably arranged guide element, which is in operative connection with the clamping leg of the clamping spring, the clamping leg being holdable in the release position by the guide element; and a pivotably mounted actuating element, by which the guide element is displaceable to transfer the clamping leg of the clamping spring from the clamping position into the release position, wherein the clamping spring is arranged between the section of the busbar and the actuating element, wherein the guide element has a slide face along which the actuating element is guidable during a pivoting movement of the actuating element, wherein the guide element has two longitudinal side walls and two end walls arranged at right angles to the two longitudinal side walls, and wherein the slide face is arranged on one of the two end walls of the guide element.

2. The connection arrangement of claim 1, wherein the actuating element has a rotational element, which is movable along the slide face of the guide element during the pivoting movement of the actuating element.

3. The connection arrangement of claim 2, wherein the actuating element has two arms arranged parallel to each other, and wherein the rotational element extends between the two arms.

4. The connection arrangement of claim 3, wherein the two arms each have a guide surface on one end section, which guide surface is configured to glide along in each case an edge face of the two longitudinal side walls of the guide element during the pivoting movement of the actuating element.

5. The connection arrangement of claim 1, wherein the actuating element has a grip section for manual actuation of the actuating element.

6. The connection arrangement of claim 1, wherein the slide face starting from an edge face of one of the two end walls extends in a direction of the actuating element.

7. The connection arrangement of claim 1, wherein the guide element is displaceable such that a displacement movement of the guide element takes place transversely to an insertion direction of the conductor connectable into the conductor connection space.

8. The connection arrangement of claim 1, wherein the guide element has at least one spring contact edge against which the clamping leg rests.

9. The connection arrangement of claim 8, wherein the clamping leg has two slide sections, each arranged on a side of a main section having a clamping edge, wherein the guide element has two spring contact edges arranged at a distance from each other, and wherein a first slide section rests against a first spring contact edge and a second slide section rests against a second spring contact edge.

10. The connection arrangement of claim 1, wherein the two longitudinal side walls of the guide element in the insertion direction of the conductor are formed so long that the two longitudinal side walls delimit the conductor connection space at a first side and a second side opposite the first side.

11. The connection arrangement of claim 1, wherein the clamping spring is supported on the busbar by the retaining leg.

12. The connection arrangement of claim 1, further comprising:

a release element, which in the release position of the clamping leg of the clamping spring is in engagement with the guide element, wherein the release element during insertion of the conductor connectable into the conductor connection space is actuatable by the release element such that the release element is configured to come out of engagement with the guide element and the guide element is displaceable by a spring force of the clamping leg such that the clamping leg is transferrable into the clamping position in order to clamp the conductor against the busbar.

13. The connection arrangement of claim 12, wherein the release element is mounted so as to be tiltable relative to the guide element.

14. The connection arrangement of claim 12, wherein the release element has at least one undercut, which in the release position of the clamping leg of the clamping spring is latched with at least one latching lug of the guide element.

15. The connection arrangement of claim 12, wherein the release element is connected to the retaining leg of the clamping spring.

16. A clamp terminal, comprising:

a housing, in which at least one connection arrangement of claim 1 is arranged.

17. An electronic device, comprising:

at least one connection arrangement of claim 1.

18. An electronic device, comprising:

at least one clamp terminal of claim 16.

19. A connection arrangement for connecting an electrical conductor, comprising:

a busbar;

a clamping spring, which has a retaining leg and a clamping leg, the clamping leg being transferable into a clamping position and into a release position;

a conductor connection space formed between a section of the busbar and the clamping leg of the clamping spring;

a displaceably arranged guide element, which is in operative connection with the clamping leg of the clamping spring, the clamping leg being holdable in the release position by the guide element; and a pivotably mounted actuating element, by which the guide element is displaceable to transfer the clamping leg of the clamping spring from the clamping position into the release position, wherein the clamping spring is arranged between the section of the busbar and the actuating element, and wherein the guide element has at least one spring contact edge against which the clamping leg rests.

20. A connection arrangement for connecting an electrical conductor, comprising:

a busbar;

a clamping spring, which has a retaining leg and a clamping leg, the clamping leg being transferable into a clamping position and into a release position;

a conductor connection space formed between a section of the busbar and the clamping leg of the clamping spring;

a displaceably arranged guide element, which is in operative connection with the clamping leg of the clamping spring, the clamping leg being holdable in the release position by the guide element;

a pivotably mounted actuating element, by which the guide element is displaceable to transfer the clamping leg of the clamping spring from the clamping position into the release position; and a release element, which in the release position of the clamping leg of the clamping spring is in engagement with the guide element, wherein the clamping spring is arranged between the section of the busbar and the actuating element, and wherein the release element during insertion of the conductor connectable into the conductor connection space is actuatable by the release element such that the release element is configured to come out of engagement with the guide element and the guide element is displaceable by a spring force of the clamping leg such that the clamping leg is transferrable into the clamping position in order to clamp the conductor against the busbar.

* * * * *